Figures 1, 2, 3:
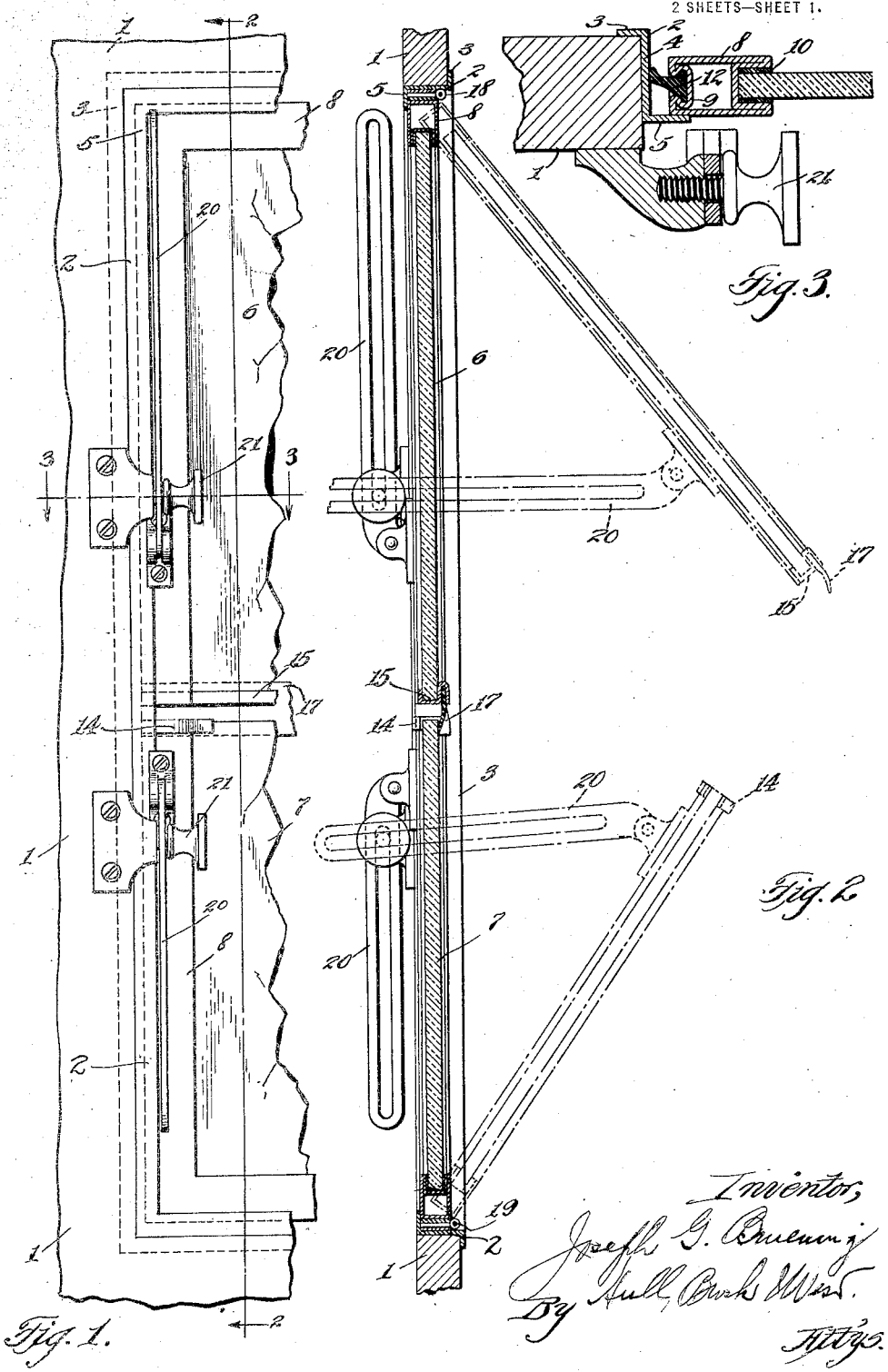

J. G. BRUENING.
WINDSHIELD.
APPLICATION FILED JUNE 29, 1921.

1,429,223.

Patented Sept. 19, 1922.
2 SHEETS—SHEET 1.

Inventor,
Joseph G. Bruening
By Hull, Burk & West
Attys.

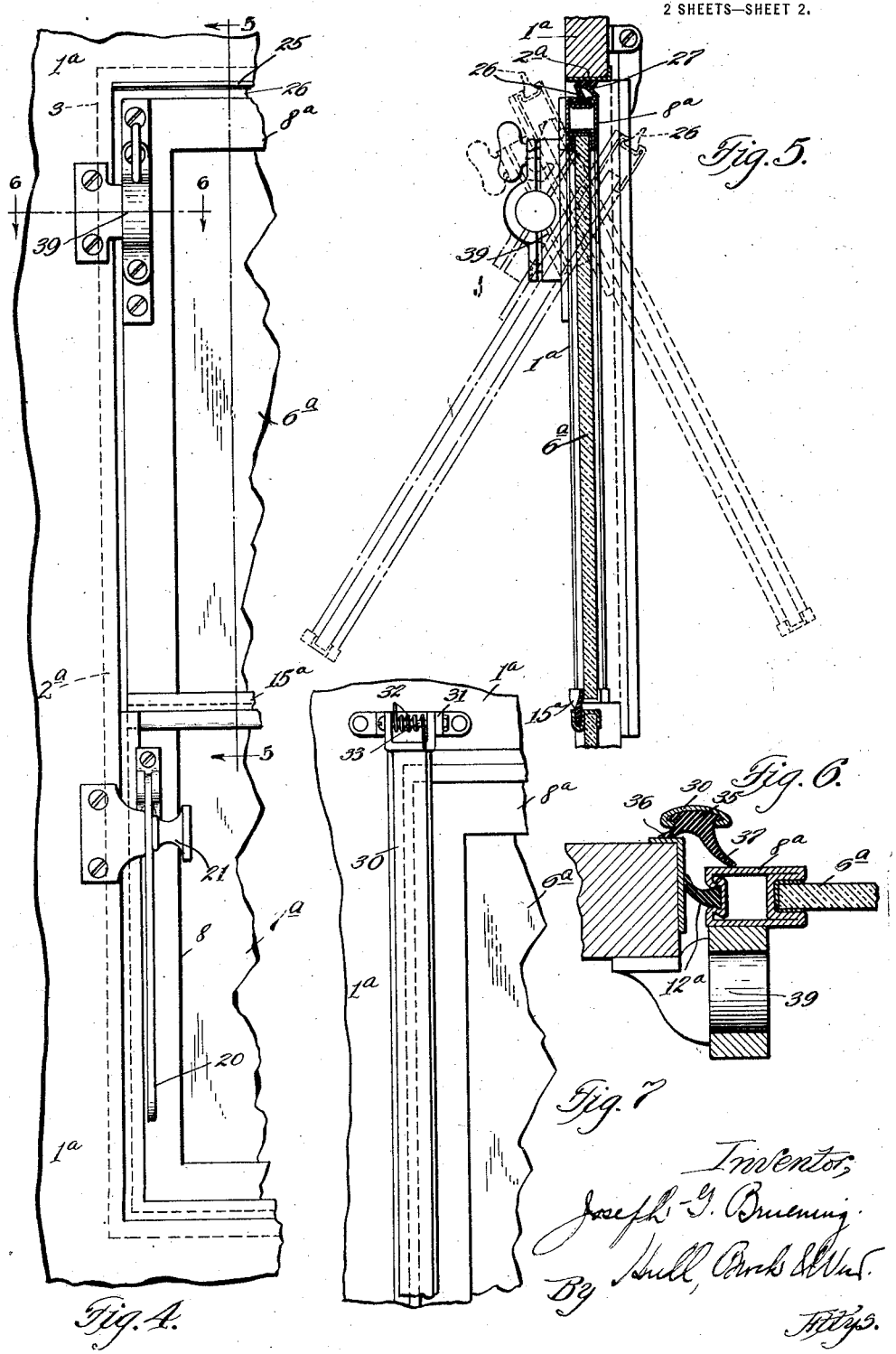

Patented Sept. 19, 1922.

1,429,223

UNITED STATES PATENT OFFICE.

JOSEPH G. BRUENING, OF CLEVELAND, OHIO.

WINDSHIELD.

Application filed June 29, 1921. Serial No. 481,179.

*To all whom it may concern:*

Be it known that I, JOSEPH G. BRUENING, a citizen of the United States, residing at Cleveland, in the county of Cuyahoga and State of Ohio, have invented a certain new and useful Improvement in Windshields, of which the following is a full, clear, and exact description, reference being had to the accompanying drawings.

This invention relates to windshields and has for its objects, to provide a windshield which shall include novel means for weather proofing the edges of the shield and which shall permit the shield to be opened and closed easily; to provide a windshield which may be adjusted to the frame when installing the same and yet secure a tight joint about the edges thereof without twisting the frame out of shape; to provide a windshield which shall be simple in construction, inexpensive to manufacture and which may be easily installed, while further objects and advantages will appear as the description proceeds.

In the accompanying drawings wherein I have shown certain illustrative embodiments of my invention but without intent to limit myself thereto, Fig. 1 is a fragmentary view in elevation of one form of my windshield as seen from the inside; Fig. 2 is a vertical sectional view taken on the line 2—2 of Fig. 1; Fig. 3 is an enlarged detail sectional view taken on the line 3—3 of Fig. 1; Fig. 4 is a fragmentary view in elevation showing a modified form of windshield as seen from the inside; Fig. 5 is a vertical sectional view taken on the line 5—5 of Fig. 4; Fig. 6 is an enlarged detail sectional view taken on the line 6—6 of Fig. 4; and Fig. 7 is a fragmentary view in elevation of the upper half of the shield shown in Fig. 4 as seen from the outside thereof.

Describing by reference characters the various parts illustrated, and referring particularly to Figs. 1–3 inclusive, 1 indicates the frame defining a rectangular opening into which my windshield is to be mounted. A rectangular windshield frame 2 is mounted in the opening defined by the frame 1, and as shown in Figs. 2 and 3, the frame 2 is preferably formed from strip metal having a substantially Z-shaped cross section. This frame 2 is positioned in such manner that a flange 3 extending at substantially right angles from the face 4 thereof, will seat against the outer side of the frame 1, and a flange 5 extending in the opposite direction will form a stop for the windshield sections 6 and 7. Each windshield section is composed of a substantially U-shaped metal frame 8 whose outer side edges are formed with a dovetailed rubber receiving groove 9, and whose inner side and bottom edges are provided with a glass receiving groove 10. As clearly shown in Fig. 3, this frame is formed from sheet metal and is of a hollow construction to render the same as light as possible and inexpensive to manufacture. A substantially T-shaped rubber 12 is fitted in the side grooves 9 of each of the shield sections and said rubber contacts with the face 4 of the windshield frame to form a tight joint therewith. It will also be noted that a secondary seal is provided by the frames 8 contacting with the flange 5 of the windshield frame. The upper ends of the U frame of the lower shield section are each provided with a suitable glass retaining clip 14 in the usual or any approved manner. The lower edge of the upper shield section is provided with a metal strip 15 which extends entirely thereacross and, as shown in Fig. 2, this strip is substantially U-shaped in cross section to embrace the glass, and the outer side thereof is bent upon itself to form a clamp for the rubber strip 17 which seals the meeting edges of the shield sections.

The upper shield section is hinged by means of a piano hinge 18 to the top of the frame 2 and the lower shield section is similarly hinged to the lower horizontal portion of the windshield frame by a hinge 19. The sides of each shield section are provided with slotted supporting arms 20 which are pivotally fastened to the section frames 8 and which cooperate with a thumb nut and standard 21 fastened to the frame 1 to hold the shields in adjusted position.

The shields in this type of windshield open outwardly only, as shown in dotted lines in Fig. 2 and may be fastened in any adjusted position by the thumb nuts 21. When the shields are closed the top of the upper shield section and the bottom of the lower shield section abut the respective faces of the windshield pane 2 and form a tight seal therewith and also abut the flanges 5 of the frame 2 to form a secondary seal. The sides of the sections are sealed by the T rubbers 12 abutting the face 4 of the rectangular frame 2 and a secondary seal is also provided by the frames of the sections abutting the flanges 5 of said rectangular frame. The meeting edges of the shield sections are sealed by the rubber strip 17 which extends from one extreme outer side edge of the frames 8 across the sections to the opposite extreme outer edge of the frames 8.

In manufacturing my windshield, the rectangular frame 2 and the shield sections 6 and 7 are made as a unit to fit the rectangular opening defined by the frame 1. If for any reason, the frame 2 should be slightly smaller than the opening defined by the frame 1 then suitable backing strips or washers may be interposed between the frames 1 and 2 and a tight fit secured. In this connection it will be noted that the flange 3 will still contact with the outer side of the frame 1 to form a tight seal therewith and hence prevent rain and wind from penetrating between the frames 1 and 2.

In Figs. 4–7 inclusive, I have shown a modified form of construction of upper shield section and frame whereby the upper section may be opened either inwardly or outwardly. The windshield frame $2^a$ in this instance is formed of strip metal which is Z-shaped in cross section about the sides and bottom of the lower windshield section $7^a$ and which is L-shaped in cross section about the sides and top of the windshield section $6^a$. The lower windshield section $7^a$ and seals therefor are similar to that previously described, hence a description of the upper section $6^a$ only, will be set forth.

The upper windshield section is composed of an inverted U-shaped frame $8^a$ which is formed along the sides thereof with suitable dovetail grooves to receive the T rubbers $12^a$ (Fig. 6) and along the top thereof with a similar groove to receive the T rubber 26. A similar T rubber 27 projects from the top of the frame $2^a$ and abuts the front top edge of the section frame $8^a$ as clearly shown in Fig. 5. The rubber 27 forms the primary seal for the top edge of the upper section and the rubber 26 forms the secondary seal therefor. With this type of upper shield section which employs an L-shaped metal frame strip instead of the aforementioned Z strip I provide additional side seals since there is no flange to contact with the shield frame to form a secondary seal. This additional sealing means is in the form of vertically disposed spring pressed sealing strips 30, each of which is hingedly connected to a suitable bracket 31 fastened to the outer face of the frame $1^a$ in vertical alignment with the side edges of the shield 32 coiled about the pivot one end thereof engaged strip serves to urge edges of the frames $8^a$ and $1^a$. The sealing strips 30 may be formed from channeled metal as shown in Fig. 6 and fitted with a rubber strip 35 which is provided with suitable contacting branches 36 and 37. These strips 30 preferably extend from the extreme upper edge of the shield frame $8^a$ to a point slightly below the upper edge of the lower shield section as clearly shown in Fig. 5. The seal between the upper and lower shield sections is similar to that previously described except that in the present instance the sealing strip $15^a$ is attached to the top edge of the lower shield section instead of the lower edge of the top shield section. The upper shield may be pivoted in any suitable manner, as by the pivotal clamp brackets 39 fastened to the side frame $1^a$.

From the foregoing it will be seen that I have provided a double seal about the top and side edges of the upper shield which may be swung inwardly or outwardly as desired and retained in the adjusted position by the clamp brackets 39. The sides of the upper shield section are sealed by the sealing strip 30 and a secondary seal is also provided by the T rubbers $12^a$. The top of the shield is sealed by the T rubber 27 projecting from the top of the metal frame $2^a$ and a secondary seal is provided by the T strip 26 projecting from the top edge of the shield frame $8^a$. The lower shield is sealed similar to that previously described in connection with Figs. 1–3.

This modified type of windshield will be manufactured with the frame $2^a$ and shield sections assembled therein as a unit and may be fitted to the frame opening $1^a$ in a manner similar to that previously described if it is found necessary to do so.

Having thus described my invention, what I claim is:

1. A windshield comprising a metallic frame adapted to be fitted into an opening, upper and lower windshield sections pivotally supported within said frame, said lower section being hingedly connected along its lower edge to said frame and adapted to open outwardly therefrom independently of said upper section, a flange formed on said frame and adapted to overlap the frame defining said opening, and a second flange formed on said metal frame about the sides and bottom of said lower shield section and projecting in an opposite direction from said first flange, said second flange being adapted to contact with said lower shield section and form a seal therewith.

2. A windshield comprising a metallic frame adapted to be fitted into an opening, an upper windshield section pivotally supported within said frame, a lower windshield section hingedly connected to the bottom of said frame, and on said frame about the bottom and sides of said lower section and adapted to contact therewith to form a seal, and additional means for sealing the edges of said section.

3. The combination with a vehicle, of a windshield frame positioned transversely thereacross, an upper windshield section pivotally supported within said frame, a lower windshield section hingedly connected along its lower edge to said frame, said lower section being adapted to open outwardly independently of said upper section, and a flange formed on said frame about the sides and bottom of said lower section and adapted to contact therewith to limit the inward movement of said lower section.

In testimony whereof, I hereunto affix my signature.

JOSEPH G. BRUENING.